(12) United States Patent
Cho et al.

(10) Patent No.: US 10,879,003 B2
(45) Date of Patent: Dec. 29, 2020

(54) ELECTRONIC COMPONENT HAVING METAL FRAMES FOR MOUNTING

(71) Applicant: SAMSUNG ELECTRO-MECHANICS CO., LTD., Suwon-si (KR)

(72) Inventors: Beom Joon Cho, Suwon-si (KR); Sang Soo Park, Suwon-si (KR); Ki Young Kim, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 15 days.

(21) Appl. No.: 16/172,077

(22) Filed: Oct. 26, 2018

(65) Prior Publication Data
US 2020/0075245 A1 Mar. 5, 2020

(30) Foreign Application Priority Data

Sep. 4, 2018 (KR) .................. 10-2018-0105439

(51) Int. Cl.
*H01G 4/232* (2006.01)
*H01G 4/38* (2006.01)
(Continued)

(52) U.S. Cl.
CPC ............ *H01G 4/232* (2013.01); *H01G 4/30* (2013.01); *H01G 4/38* (2013.01); *H01G 4/012* (2013.01);
(Continued)

(58) Field of Classification Search
CPC .......... H01G 4/232; H01G 4/30; H01G 4/012; H01G 4/38; H01G 4/248
See application file for complete search history.

(56) References Cited

U.S. PATENT DOCUMENTS 6,518,632 B1    2/2003  Yoshida et al.
7,331,799 B1 *  2/2008  Lee ......................... H01G 2/06
                                              361/306.3
(Continued)

FOREIGN PATENT DOCUMENTS

EP      1024507 A1 *  8/2000  ............. H01G 2/065
JP      01123332 U  *  8/1989
(Continued)

OTHER PUBLICATIONS

Notice of Office Action issued in Korean Patent Application No. 10-2018-0105439 dated Dec. 4, 2019 (English Translation).

*Primary Examiner* — David M Sinclair
(74) *Attorney, Agent, or Firm* — Morgan, Lewis & Bockius LLP

(57) ABSTRACT

An electronic component includes a body in which external electrodes are disposed on opposing surfaces of the body in a first direction thereof, respectively; and a pair of metal frames connected to the external electrodes, respectively, wherein the metal frame includes a support portion bonded to the external electrodes, and a mounting portion extending in the first direction from a lower end of the support portion and spaced apart from the body and the external electrodes, and a length of the mounting portion in a second direction perpendicular to the first direction is smaller than a length of the body in the second direction.

20 Claims, 12 Drawing Sheets

(51) Int. Cl.
*H01G 4/30* (2006.01)
*H01G 4/12* (2006.01)
*H01G 4/012* (2006.01)

(52) U.S. Cl.
CPC ......... *H01G 4/1227* (2013.01); *H01G 4/1245* (2013.01)

(56) References Cited

U.S. PATENT DOCUMENTS

| | | | |
|---|---|---|---|
| 9,911,535 B2 | 3/2018 | Mori et al. | |
| 2003/0011959 A1* | 1/2003 | Moriwaki | H01G 4/228 361/308.1 |
| 2004/0145065 A1* | 7/2004 | Sano | H01G 9/012 257/787 |
| 2009/0147440 A1* | 6/2009 | Cygan | H01G 4/232 361/306.3 |
| 2010/0188798 A1* | 7/2010 | Togashi | H01G 2/06 361/306.3 |
| 2015/0022937 A1* | 1/2015 | Park | H01G 4/30 361/270 |
| 2015/0187495 A1* | 7/2015 | Maeda | H01G 4/30 361/303 |
| 2015/0296623 A1* | 10/2015 | Trinh | H01L 23/498 174/260 |
| 2016/0212843 A1* | 7/2016 | Park | H05K 1/181 |
| 2018/0374639 A1* | 12/2018 | Akiyoshi | H01G 4/232 |

FOREIGN PATENT DOCUMENTS

| | | | | |
|---|---|---|---|---|
| JP | 08017679 A | * | 1/1996 | ............ H01G 4/252 |
| JP | 10241989 A | * | 9/1998 | ............ H01G 2/065 |
| JP | H11-251176 A | | 9/1999 | |
| JP | 2000-223359 A | | 8/2000 | |
| JP | 2004-273935 A | | 9/2004 | |
| JP | 2010161172 A | * | 7/2010 | ............ H01G 4/252 |
| JP | 2011009435 A | * | 1/2011 | ............ H01G 4/232 |
| JP | 2012033632 A | * | 2/2012 | ............ H01G 4/232 |

* cited by examiner ized from the following detailed description taken in conjunction with the accompanying drawings.

ELECTRONIC COMPONENT HAVING METAL FRAMES FOR MOUNTING

CROSS-REFERENCE TO RELATED APPLICATION(S)

This application claims benefit of the priority to Korean Patent Application No. 10-2018-0105439 filed on Sep. 4, 2018 in the Korean Intellectual Property Office, the disclosure of which is incorporated herein by reference in its entirety.

TECHNICAL FIELD

The present disclosure relates to an electronic component.

BACKGROUND

Multilayer capacitors are used in various electronic devices because they may be implemented to have small size and high capacity.

In recent years, due to the rapid rise of environmentally-friendly automobiles and electric vehicles, power driving systems in automobiles have been increased, and accordingly, demand for the multilayer capacitors required for automobiles has also increased.

Since a high level of thermal reliability, electrical reliability, and mechanical reliability are required for use as an automotive part, the performance required of multilayer capacitors is also being advanced.

In addition, the multilayer ceramic capacitor may have a structure in which a plurality of dielectric layers and internal electrodes having different polarities and which are alternately disposed between the dielectric layers are stacked.

Here, since the dielectric layers have piezoelectric properties, a piezoelectric phenomenon may occur between the internal electrodes when direct current (DC) or alternating current (AC) voltages are applied to the multilayer ceramic capacitor to thereby generate periodical vibrations while expanding and contracting a volume of a capacitor body depending on a frequency.

Such vibrations may be transferred to a substrate through external electrodes of the multilayer capacitor and solders connecting the external electrodes and the substrate to each other, such that the entirety of the substrate becomes a sound reflecting surface to thereby generate vibration sound, which is noise.

Such a vibration sound may correspond to an audible frequency in the range of 20 to 20,000 Hz making persons uncomfortable. The vibration sound making the persons uncomfortable as described above is called acoustic noise.

Meanwhile, as a method for reducing such acoustic noise, there is an electronic component having a structure in which the multilayer capacitor is mounted to be spaced apart from a substrate by a predetermined distance by using a metal frame.

However, in the case of the conventional electronic component using the metal frame, when a position and a direction of the metal frame are deviated from regular position and direction on the design at the time of mounting the electronic component on the substrate, a mounting portion of the metal frame is in contact with other adjacent land patterns, which tends to result in a short circuit defect between the components.

SUMMARY

An aspect of the present disclosure may provide an electronic component capable of improving durability and reliability against vibration and deformation, reducing acoustic noise, and preventing a mounting portion of a metal frame from being in contact with other adjacent land patterns at the time of mounting the electronic component on a substrate to thereby prevent a short circuit defect between components.

According to an aspect of the present disclosure, an electronic component may include a body; external electrodes respectively disposed on opposing surfaces of the body in a first direction of the body; and a pair of metal frames connected to the external electrodes, respectively. Each of the pair of metal frames includes a support portion bonded to the external electrodes, and a mounting portion extending in the first direction from a lower end of the support portion and spaced apart from the body and the external electrodes, and a width of the mounting portion in a second direction perpendicular to the first direction is smaller than a width of the body in the second direction.

$0.2 \leq d/t < 1.0$ may be satisfied, in which dimension "t" is the total height of the electronic component in a third direction perpendicular to the first and second directions and dimension "d" is the length of the mounting portion in the second direction.

A width of the support portion in the second direction may be smaller than the width of the body in the second direction.

A width of a lower portion of the support portion in the second direction may be smaller than a width of an upper portion of the support portion in the second direction.

The support portion may have cutout portions formed in opposite side surfaces of the lower portion of the support portion.

The cutout portions may be formed in a quadrangular shape.

The support portion may be formed in a T shape.

The cutout portions may be formed in a triangular shape.

The lower portion of the support portion may be formed in a trapezoidal shape.

The body may include a dielectric layer, and first and second internal electrodes alternately disposed while having the dielectric layer interposed therebetween.

Each of the external electrodes may include a head portion disposed on the opposing surfaces of the body in the second direction; and a band portion extending from the head portion to portions of upper and lower surfaces of the body and to portions of opposite side surfaces of the body in the second direction.

A conductive adhesive portion may be disposed between the head portion of the external electrodes and the support portion.

According to another aspect of the present disclosure, an electronic component may include a capacitor array including a plurality of multilayer capacitors which are sequentially arranged in one direction. Each of the plurality of multilayer capacitors may include a body; external electrodes respectively disposed on opposing surfaces of the body in a length direction of the body; and a pair of metal frames connected to the external electrodes, respectively. Each of the pair of metal frames includes a support portion bonded to the external electrodes, and a mounting portion extending in the length direction from a lower end of the support portion and spaced apart from the body and the external electrodes, and a width of the mounting portion in a width direction, which is identical to the one direction and perpendicular to the length direction, is smaller than a width of the body in the width direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
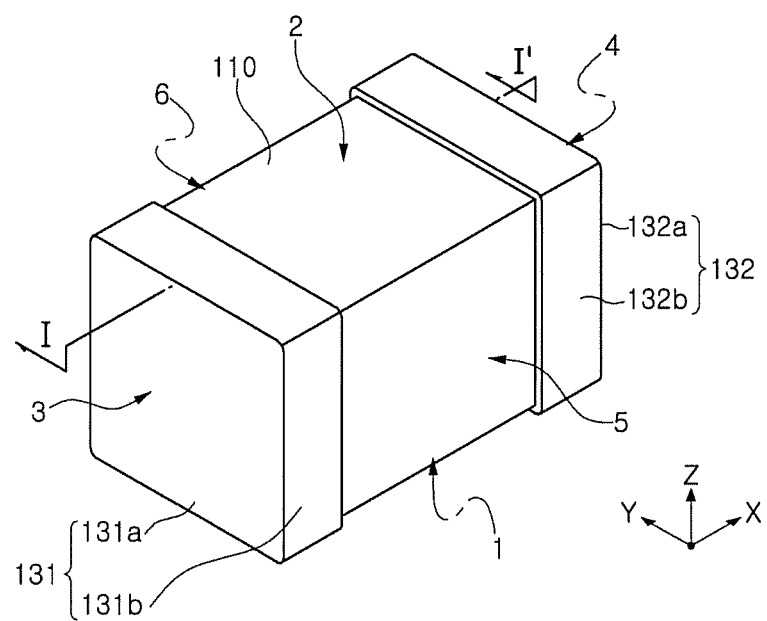
FIG. 1 is a perspective view schematically illustrating a multilayer capacitor applied to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor and an electronic component, respectively.

Here, the Z direction refers to a stacked direction in which dielectric layers are stacked in the present exemplary embodiment.

Figure 2A:
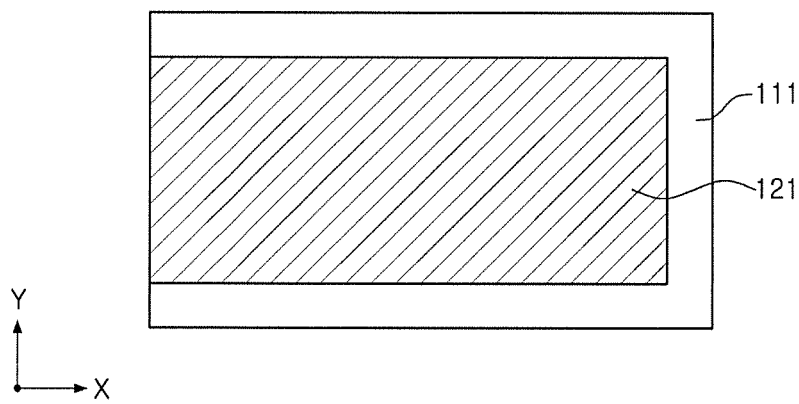
FIGS. 2A and 2B are plan views illustrating first and second internal electrodes applied to the multilayer capacitor of FIG. 1.
Figure 2B:
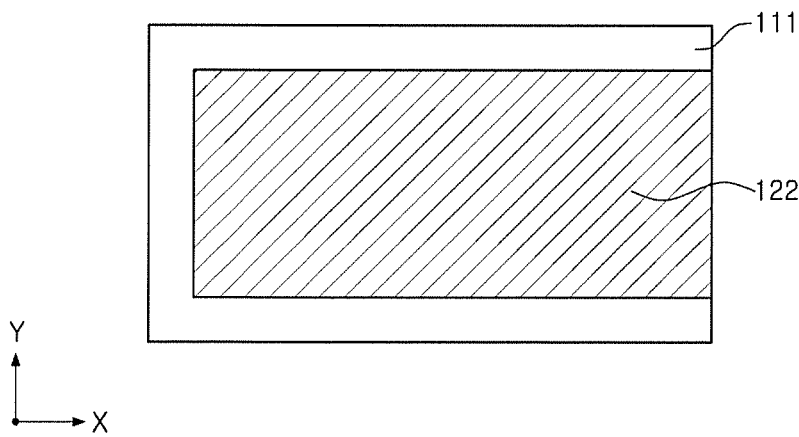
Figure 3:
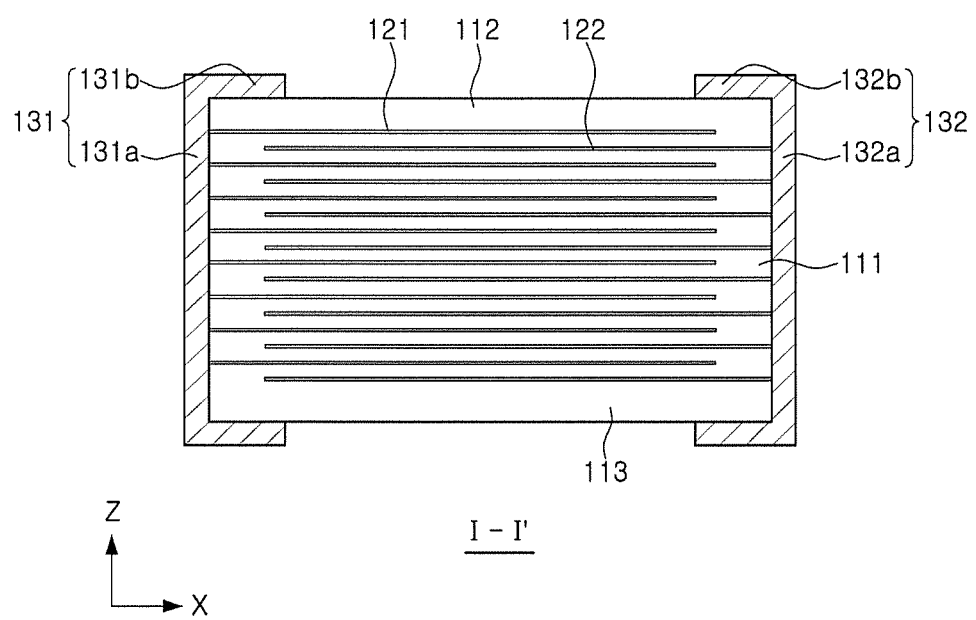
FIG. 3 is a cross-sectional view taken along a line I-I' of FIG. 1.

FIG. 1 is a perspective view schematically illustrating a multilayer capacitor applied to an exemplary embodiment in the present disclosure, FIGS. 2A and 2B are plan views illustrating first and second internal electrodes applied to the multilayer capacitor of FIG. 1, and FIG. 3 is a cross-sectional view taken along a line I-I' of FIG. 1.

First, a structure of a multilayer capacitor applied to an electronic component according to the present exemplary embodiment will be described with reference to FIGS. 1 through 3.

Referring to FIGS. 1 through 3, a multilayer capacitor 100 according to the present exemplary embodiment may include a body 110, and first and second external electrodes 131 and 132 disposed on opposite end surfaces of the body 110, respectively, in an X direction, which is a first direction of the body 110.

The body 110 may be formed by stacking a plurality of dielectric layers 111 in a Y direction of the body 110 and then sintering the plurality of dielectric layers 111. The dielectric layers 111 adjacent to each other of the body 110 of the capacitor may be integrated with each other so that boundaries therebetween are not readily apparent without using a scanning electron microscope (SEM).

In addition, the body 110 may include the plurality of dielectric layers 111, and first and second internal electrodes 121 and 122 having different polarities alternately disposed in a Z direction of the body 110 while having the dielectric layers 111 interposed therebetween.

In addition, the body 110 may include an active region as a portion contributing to forming a capacitance of the capacitor, and cover regions 112 and 113 provided on upper and lower surfaces of the active region in the Z direction as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a $BaTiO_3$ based ceramic powder or the like.

An example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which Ca, Zr, or the like, is partially dissolved in $BaTiO_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

The first and second internal electrodes 121 and 122, which are electrodes to which different polarities are applied, may be disposed on the dielectric layer 111 to be stacked in the Z direction of the body 110, and may be alternately disposed in the body 110 so as to opposite to each other along the Z direction of the body 110 while having one dielectric layer 111 interposed therebetween.

At this time, the first and second internal electrodes 121 and 122 may be electrically insulated from each other by the dielectric layer 111 disposed therebetween.

Meanwhile, the present disclosure illustrates and describes a structure in which the internal electrodes are staked in the Z direction of the body 110, but the present disclosure is not limited thereto and may also be applied to a structure in which the internal electrodes are stacked in the Y direction of the body, if necessary.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 131 and 132 disposed on the opposite end surfaces of the body 110 in the X direction of the body 110, respectively, to be described below.

According to the configuration as described above, when a predetermined voltage is applied to the first and second external electrodes 131 and 132, electric charges may be accumulated between the first and second internal electrodes 121 and 122.

At this time, a capacitance of the multilayer capacitor 100 may be in proportional to an overlapping area of the first and second internal electrodes 121 and 122 overlapping with each other along the Z direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd—Ag) alloy, or the like, nickel (Ni), and copper (Cu).

At this time, a method of printing the conductive paste may be a screen printing method, a gravure printing method, or the like, but is not limited thereto.

Voltages having different polarities may be provided to the first and second external electrodes 131 and 132, and the first and second external electrodes 131 and 132 may be disposed on the opposite end surfaces of the body 110 in the X direction of the body 110, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 131 to each other.

The first band portion 131b may be a portion extending from the first head portion 131a to portions of the first, second, fifth, and sixth surfaces 1, 2, 5, and 6 of the body 110 to improve fixing strength.

The second external electrode 132 may include a second head portion 132a and a second band portion 132b.

The second head portion 132a may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 132 to each other.

The second band portion 132b may be a portion extending from the second head portion 132a to portions of the first, second, fifth, and sixth surfaces 1, 2, 5, and 6 of the body 110 to improve fixing strength.

Meanwhile, the first and second external electrodes 131 and 132 may further include a plating layer (not illustrated).

The plating layer may include first and second nickel (Ni) plating layers, and first and second tin (Sn) plating layers covering the first and second Ni plating layers, respectively.

Figure 4A:
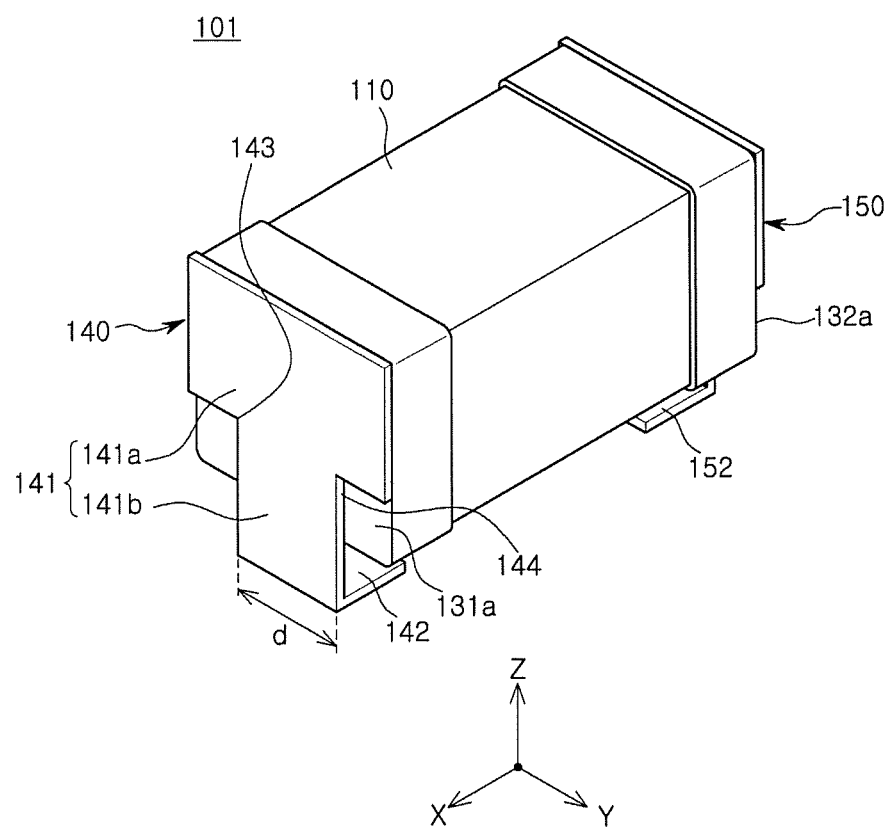
FIGS. 4A and 4B are perspective views illustrating a schematic structure of an electronic component according to an exemplary embodiment in the present disclosure.
Figure 4B:
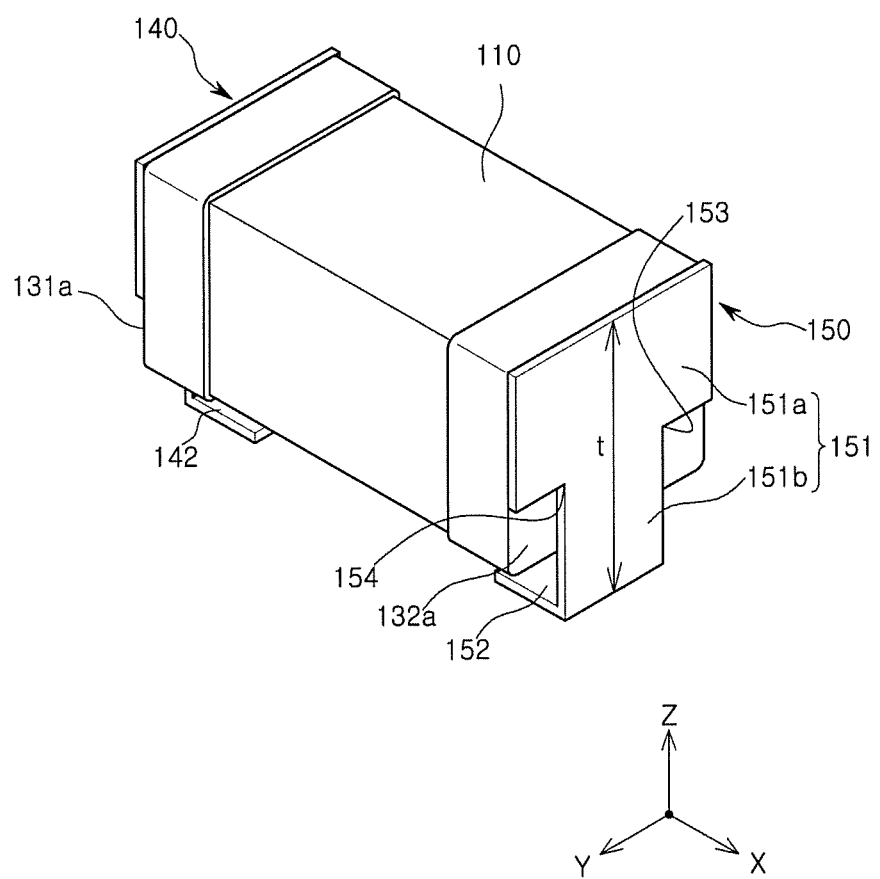

FIGS. 4A and 4B are perspective views illustrating a schematic structure of an electronic component according to an exemplary embodiment in the present disclosure.

Referring to FIGS. 4A and 4B, an electronic component 101 according to the present exemplary embodiment may include the multilayer capacitor 100, and first and second metal frames 140 and 150 connected to the first and second external electrodes 131 and 132 of the multilayer capacitor 100, respectively.

The first metal frame 140 may include a first support portion 141 and a first mounting portion 142.

The first support portion 141 may be a portion which is perpendicular to a mounting surface, is elongated in the Y direction, and is bonded to the first head portion 131a of the first external electrode 131, and may be electrically and physically connected to the first head portion 131a of the first external electrode 131.

At this time, a conductive adhesive portion (not illustrated) may be provided between the first external electrode 131 and the first support portion 141.

According to the present exemplary embodiment, the conductive adhesive portion may be provided on the first head portion 131a of the first external electrode 131.

Such a conductive adhesive portion may be formed of a high temperature solder, a conductive adhesive material, or the like, but is not limited thereto.

The first mounting portion 142 may be a portion extending in the X direction, which is the first direction from a lower end of the first support portion 141 and formed to be horizontal with respect to the mounting surface, and may serve as a connection terminal when the electronic component is mounted on the substrate.

At this time, a length of the first mounting portion 142 in the Y direction, which is the second direction perpendicular to the X direction, which is the first direction, may be greater than lengths of the body 110 and the first head portion 131a of the first external electrode 131 in the Y direction of the body 110.

In addition, the first mounting portion 142 may be disposed to be spaced apart from a lower surface of the multilayer capacitor 100 by a predetermined distance in the Z direction.

In addition, when the total height of the electronic component is t and a length of the first mounting portion 142 in the Y direction is d, $0.2 = d/t$ may be satisfied.

Meanwhile, a length of the first support portion 141 in the Y direction may be smaller than those of the body 110 and the first head portion 131a of the first external electrode 131 in the Y direction.

In addition, according to the present exemplary embodiment, a length of a lower portion 141b of the first support portion 141 may be smaller than a length of an upper portion 141a of the first support portion 141 in the Y direction.

To this end, the first support portion 141 may have cutout portions 143 and 144 formed in both side surfaces of the lower portion 141b thereof in the Y direction, respectively.

At this time, the cutout portions 143 and 144 may be formed in a quadrangular shape. As a result, a shape of the first support portion 141 may be formed in a substantially T shape when being viewed on an X-Y plane.

In addition, the cutout portions 143 and 144 may connect the lower portion 141b of the first support portion 141 and the first mounting portion 142 to each other.

The second metal frame 150 may include a second support portion 151 and a second mounting portion 152.

The second support portion 151 may be a portion which is perpendicular to a mounting surface, is elongated in the Y direction, and is bonded to the second head portion 132a of the second external electrode 132, and may be electrically and physically connected to the second head portion 132a of the second external electrode 132.

At this time, a conductive adhesive portion may be provided between the second external electrode 132 and the second support portion 151.

According to the present exemplary embodiment, the conductive adhesive portion may be provided on the second head portion 132a of the second external electrode 132.

Such a conductive adhesive portion may be formed of a high temperature solder, a conductive adhesive material, or the like, but is not limited thereto.

The second mounting portion 152 may be a portion extending in the X direction, which is the first direction from a lower end of the second support portion 151 and formed to be horizontal with respect to the mounting surface, and may serve as a connection terminal when the electronic component is mounted on the substrate.

At this time, a length of the second mounting portion 152 in the Y direction, which is the second direction perpendicular to the X direction, which is the first direction, may be smaller than lengths of the body 110 and the second head portion 132a of the second external electrode 132 in the Y direction.

In addition, the second mounting portion 152 may be disposed to be spaced apart from a lower surface of the multilayer capacitor 100 by a predetermined distance in the Z direction.

When the total height of the electronic component is t and a length of the second mounting portion 152 in the Y direction is d, 0.2=d/t may be satisfied.

Meanwhile, a length of the second support portion 151 in the Y direction may be smaller than those of the body 110 and the second head portion 132a of the second external electrode 132 in the Y direction.

In addition, according to the present exemplary embodiment, a length of a lower portion 151b of the second support portion 151 may be smaller than a length of an upper portion 151a of the second support portion 151 in the Y direction.

To this end, the second support portion 151 may have cutout portions 153 and 154 formed in both side surfaces of the lower portion 151b thereof in the Y direction, respectively.

At this time, the cutout portions 153 and 154 may be formed in a quadrangular shape. As a result, a shape of the second support portion 151 may be formed in a substantially T shape when being viewed on an X-Y plane.

In addition, the cutout portions 153 and 154 may connect the lower portion 151b of the second support portion 151 and the second mounting portion 152 to each other.

A multilayer capacitor according to the related art has a structure in which a capacitor body and a substrate are in direct contact with each other by a solder when being mounted on the substrate. Here, since heat or mechanical deformation generated in the substrate is directly transferred to the multilayer capacitor, it is difficult to secure a high level of reliability.

The electronic component according to the present exemplary embodiment may secure an interval between the multilayer capacitor 100 and the substrate by bonding the first and second metal frames 140 and 150 onto the opposite end surfaces of the multilayer capacitor 100. As a result, when the electronic component 200 is mounted on the substrate, stress from the substrate may be prevented from being directly transferred to the multilayer capacitor 100, such that thermal reliability, mechanical reliability, and tolerance to warpage deformation of the electronic component 200 may be improved.

In addition, since the multilayer capacitor is mounted on the substrate to be spaced apart from the substrate by the predetermined interval by the metal frames when the multilayer capacitor is mounted on the substrate, vibration generated in the multilayer capacitor by a piezoelectric phenomenon may be reduced and acoustic noise may be reduced.

Meanwhile, in the case of the electronic component using the metal frame, when a position and a direction of the metal frame are deviated from regular position and direction on the design at the time of mounting the electronic component on the substrate, an end of the mounting portion of the metal frame is in contact with other adjacent land patterns, which tends to result in a short circuit defect between the components.

In the electronic component according to the present exemplary embodiment, since the length of the mounting portion is smaller than the length of the head portion of the external electrode, the mounting portion of the metal frame may be prevented from being in contact with other adjacent land patterns even though the position of the metal frame is distorted at the time of mounting the electronic component on the substrate, such that the occurrence of the short circuit defect between the components mounted on the substrate may be prevented.

Therefore, when the electronic component is mounted on the substrate, mounting density of the electronic component may be increased.

Meanwhile, in a case in which the lengths of the first and second mounting portions are excessively decreased, areas of the first and second mounting portions are decreased by the decreased lengths of the first and second mounting portions, such that fixing strength of the electronic component may be decreased when the electronic component is mounted on the substrate.

In addition, since the center of gravity of the electronic component according to the present exemplary embodiment is located at the top of the electronic component. Therefore, when the lengths of the first and second mounting portions are decreased, a possibility that the electronic component is reversed when being mounted on the substrate may be increased as much as the decreased lengths.

Accordingly, when a height of the electronic component is t and a length of the mounting portion in the Y direction is d, it is necessary to appropriately adjust d/t.

Figure 7:
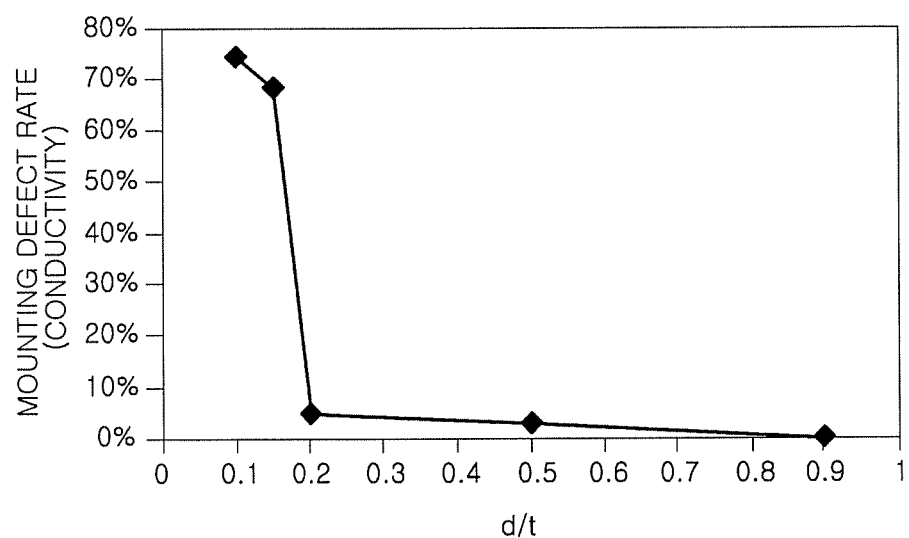
FIG. 7 is a graph illustrating a mounting defect rate according to a change in a ratio of a length of a mounting portion to a height of the electronic component.

FIG. 7 is a graph illustrating a mounting defect rate according to a change in d/t.

The mounting process defect rate was determined by using a chip mounter to mount hundred electronic components on the substrate in the range of d/t of 0.1 to 0.9, and then checking the extent that the electronic components collapse.

Referring to FIG. 7, in a case in which dt is less than 0.15, since the lengths of the mounting portions of the metal frames are too small, it may be seen that the metal frames do not support the multilayer capacitor and a mounting defect greatly occurs.

In addition, in a case in which d/t is 0.2 or more, the mounting defect rate is rapidly reduced. Therefore, in the case in which d/t is 0.2 or more, it may be determined that the mounting portions of the metal frames sufficiently support the multilayer capacitor.

Figure 8:
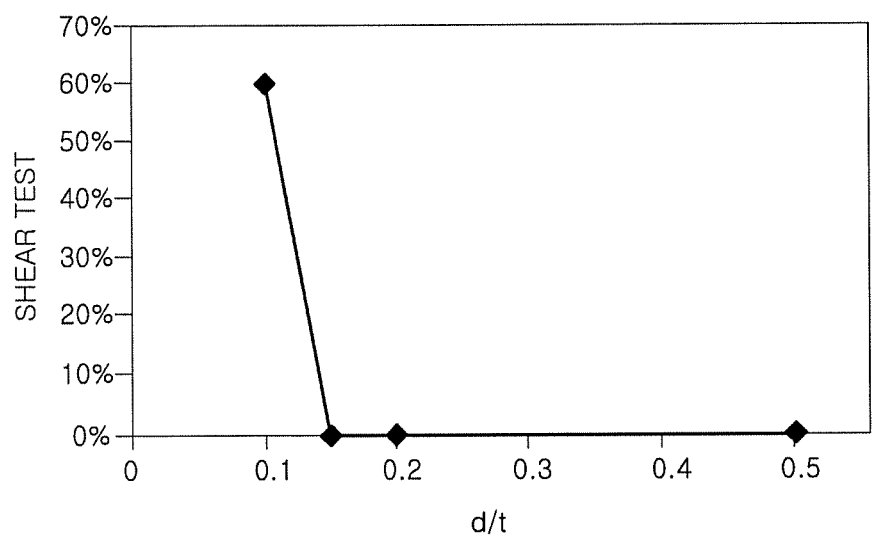
FIG. 8 is a graph illustrating a shear test result according to a change in a ratio of a length of a mounting portion to a height of the electronic component.

FIG. 8 is a graph illustrating a shear test result according to a change in d/t.

In the shear test, ten electronic components with d/t of the range of 0.1 to 0.5 were mounted on the PCB, and a force of 10 N was then applied at a speed of 1 mm/min for 10 seconds to evaluate whether or not the electronic components were detached.

In the case in which the cutout portions are formed in the metal frames, an effect of reinforcing the warpage deformation even if the reinforced degree is fine may be obtained.

Referring to FIG. 8, in a region in which d/t is 0.1 or less, it may be seen that since the lengths of the mounting portions of the metal frames are too small, the fixing force by the solders is not sufficiently applied and a defect occurs as the shear test result.

In addition, in a case in which d/t is 1.5 or more, detachment of the electronic component does not occur. Therefore, it may be determined that fixing strength is sufficiently ensured in the case in which d/t is 1.5 or more.

Therefore, it may be seen that a range of d/t capable of securing fixing strength with the substrate while preventing the mounting defect is $0.2 \leq d/t < 1.0$.

Figure 5A:
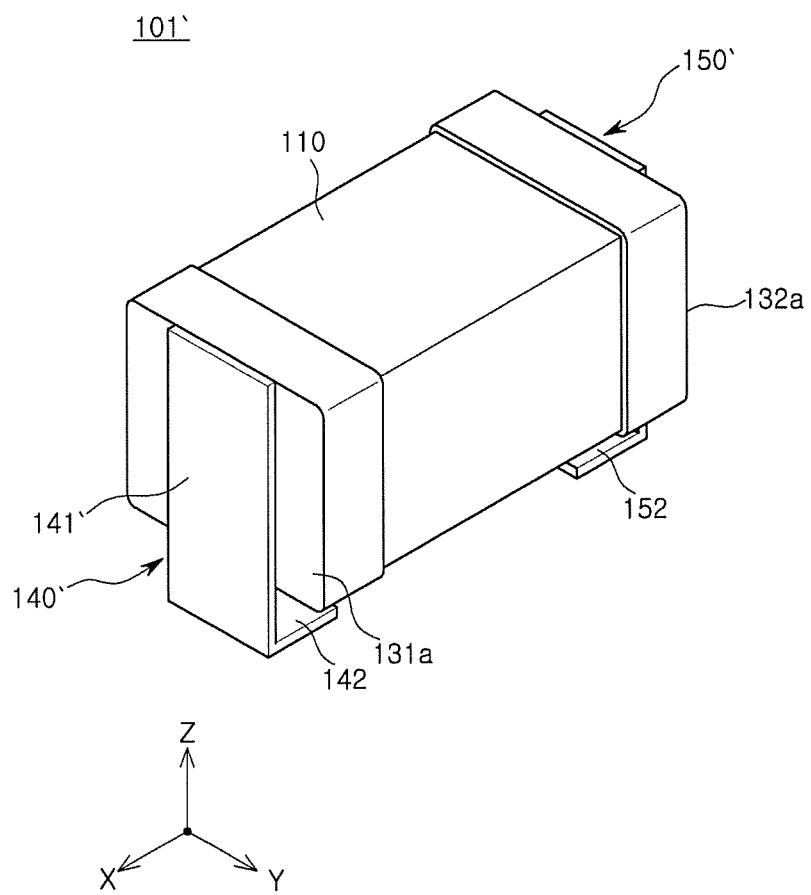
FIGS. 5A and 5B are perspective views illustrating a schematic structure of an electronic component according to another exemplary embodiment in the present disclosure.
Figure 5B:
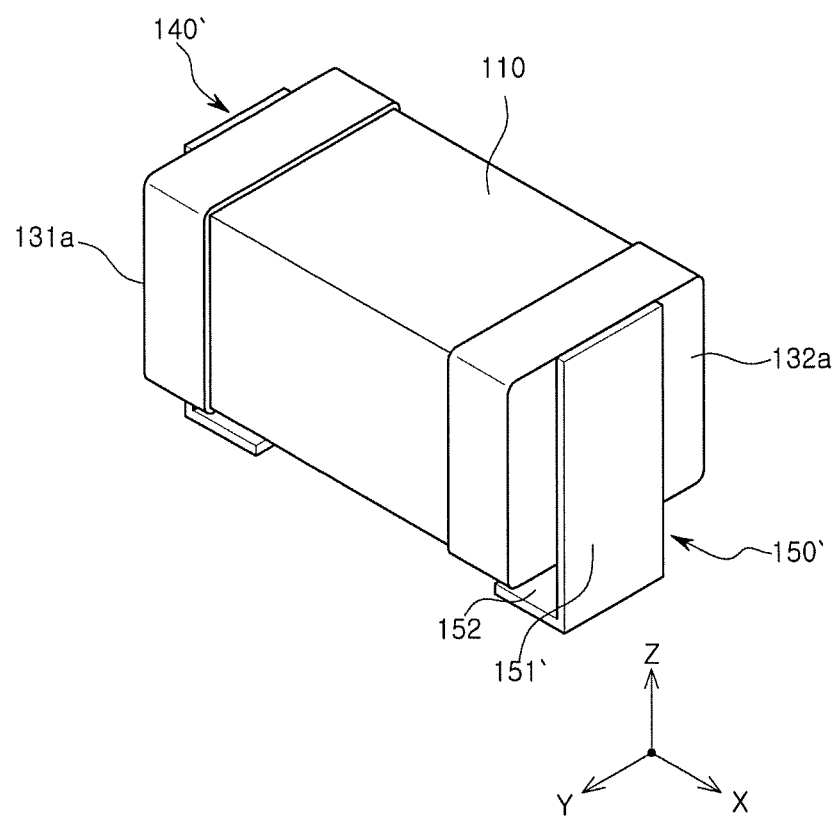

FIGS. 5A and 5B are perspective views illustrating a schematic structure of an electronic component according to another exemplary embodiment in the present disclosure.

Here, since the structure of the multilayer capacitor and the structure of the mounting portion of the metal frame are similar to those of the exemplary embodiment described above, a detailed description thereof will be omitted in order to avoid an overlapping description. A vertical portion of the metal frame having a structure different from that of the exemplary embodiment described above is illustrated and a detailed description will be provided based on the vertical portion.

Referring to FIGS. 5A and 5B, in an electronic component 101' according to the present exemplary embodiment, lower and upper portions of a first support portion 141' of a first metal frame 140' may have lengths smaller than the lengths of the body 110 and the first head portion 131a of the first external electrode 131 in the Y direction.

In addition, lower and upper portions of a second support portion 151' of a second metal frame 150' may have lengths smaller than the lengths of the body 110 and the second head portion 132a of the second external electrode 132 in the Y direction.

Accordingly, the first and second support portions 141' and 151' may be formed in a substantially rectangular shape, and the first and second metal frames 140' and 150' may be formed in a substantially L shape.

Figure 6A:
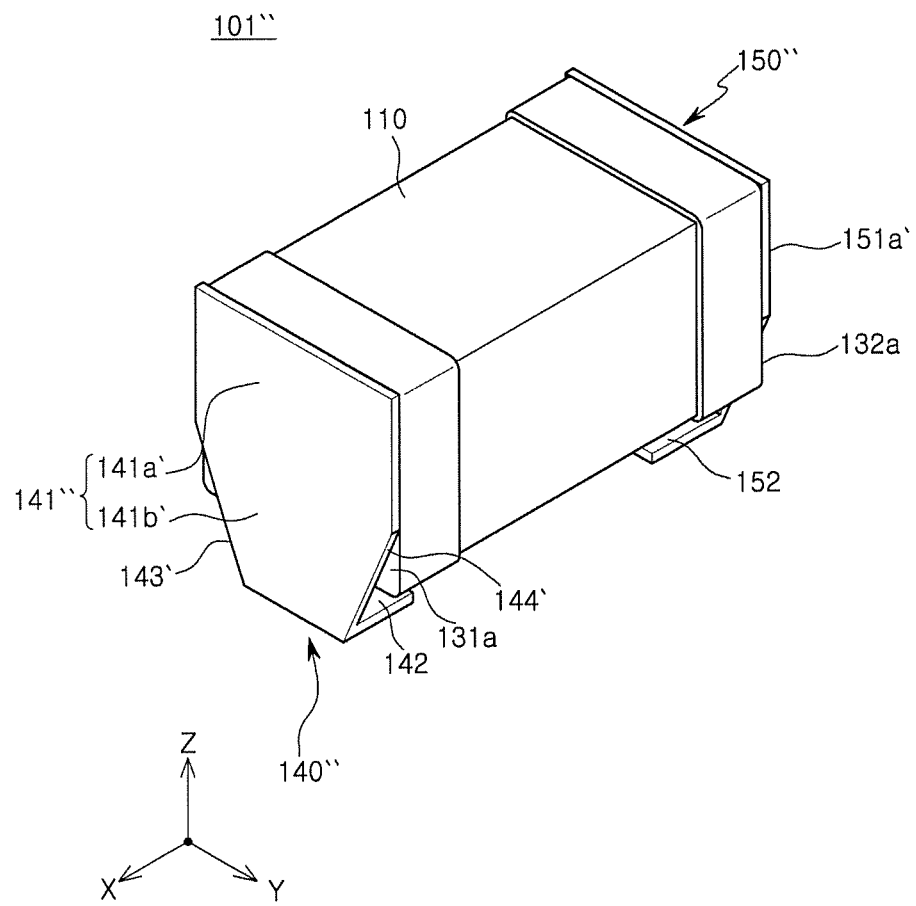
FIGS. 6A and 6B are perspective views illustrating a schematic structure of an electronic component according to another exemplary embodiment in the present disclosure.
Figure 6B:
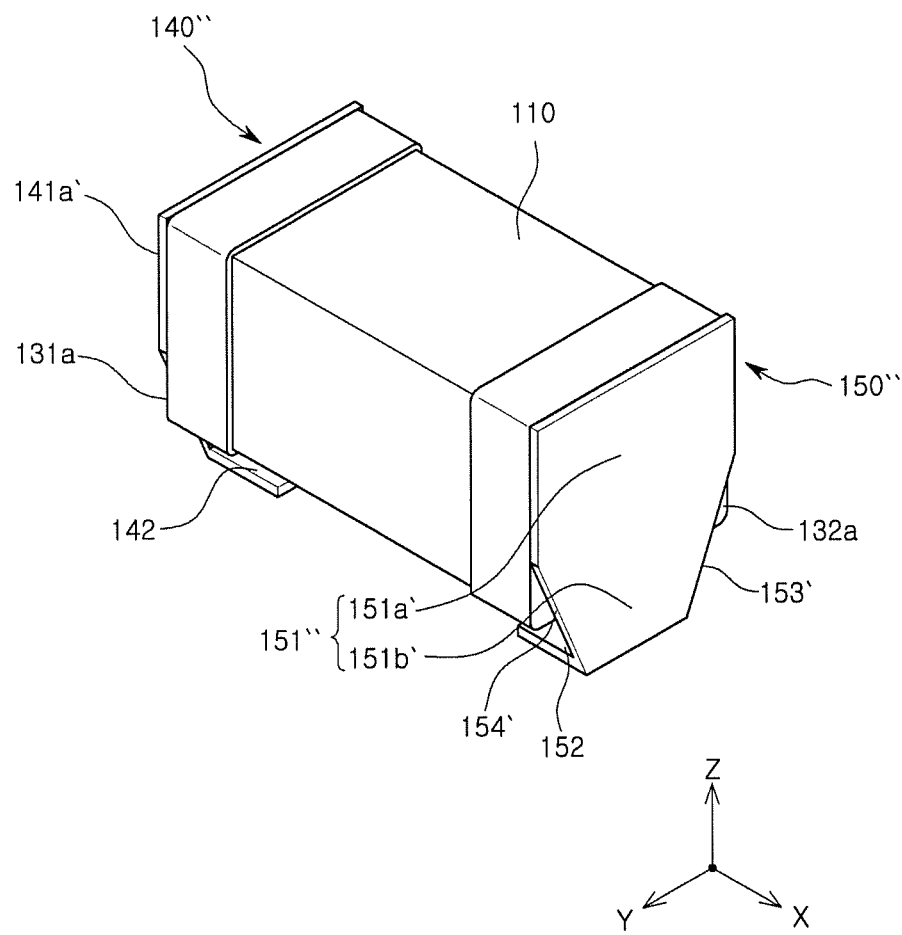

FIGS. 6A and 6B are perspective views illustrating a schematic structure of an electronic component according to another exemplary embodiment in the present disclosure.

Here, since the structure of the multilayer capacitor and the structure of the mounting portion of the metal frame are similar to those of the exemplary embodiment described above, a detailed description thereof will be omitted in order to avoid an overlapping description. A vertical portion of the metal frame having a structure different from that of the exemplary embodiment described above is illustrated and a detailed description will be provided based on the vertical portion.

Referring to FIGS. 6A and 6B, in an electronic component 101" according to the present exemplary embodiment, a lower portion 141b' of a first support portion 141" of a first metal frame 140" may have a length smaller than that of an upper portion 141a' thereof in the Y direction.

At this time, cutout portions 143' and 144' may be formed in opposite side surfaces of the lower portion 141b' of the first support portion 141" in the Y direction and may be formed in a triangular shape, such that the lower portion 141b' of the first support portion 141" may be formed in a trapezoidal shape.

In addition, a lower portion 151b' of a second support portion 151" of a second metal frame 150" may have a length smaller than that of an upper portion 151a' thereof in the Y direction.

At this time, cutout portions 153' and 154' may be formed in opposite side surfaces of the lower portion 151b' of the second support portion 151" in the Y direction and may be formed in a triangular shape, such that the lower portion 151b' of the second support portion 151" may be formed in a trapezoidal shape.

As set forth above, according to the exemplary embodiment in the present disclosure, the durability and reliability of the multilayer capacitor against vibration and deformation may be increased, the acoustic noise may be reduced by reducing the vibration generated by the piezoelectric phenomenon in the multilayer capacitor, and the short circuit defect between the components may be prevented by preventing the mounting portion of the metal frame from being in contact with other adjacent land patterns at the time of mounting the multilayer capacitor on the substrate.

Figure 9:
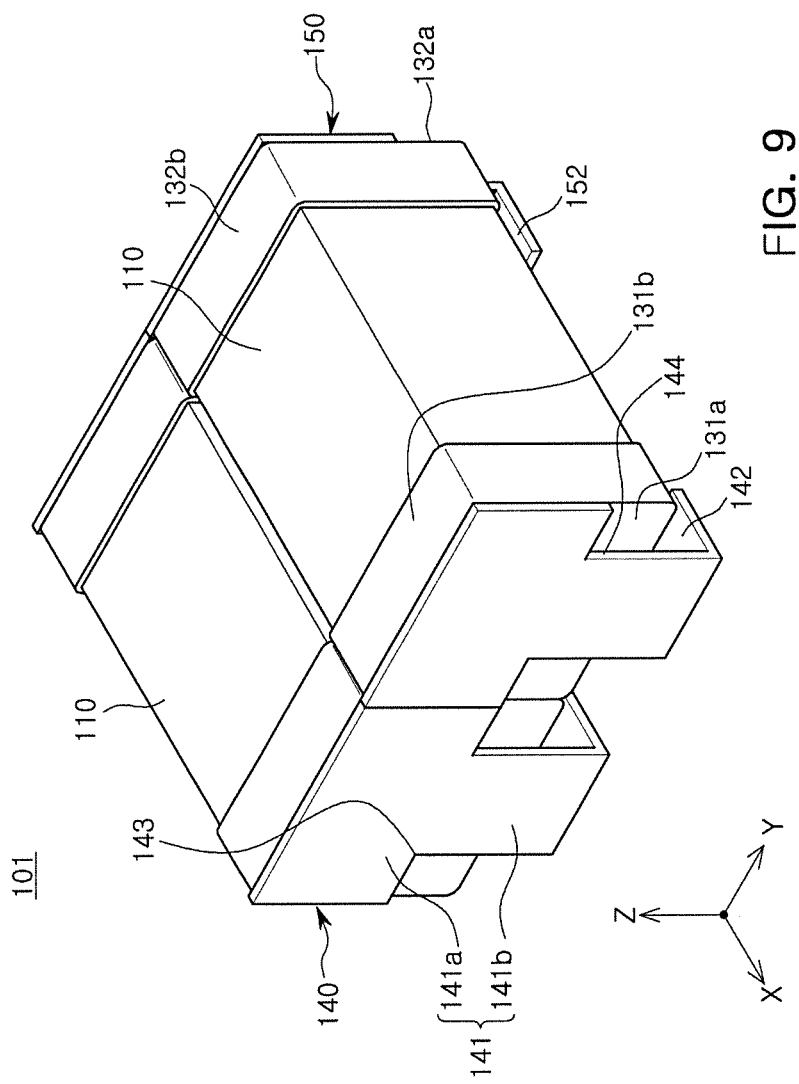
FIG. 9 is a perspective view schematically illustrating an electronic component applied to another exemplary embodiment in the present disclosure, which includes a plurality of multilayer capacitors sequentially arranged in one direction as a capacitor array.

According to another exemplary embodiment in the present disclosure, FIG. 9 is a perspective view schematically illustrating an electronic component 101, which includes a plurality of multilayer capacitors sequentially arranged in one direction as a capacitor array.

As shown in FIG. 9, each of the plurality of multilayer capacitors may include a body 110, external electrodes respectively disposed on opposing surfaces of the body 110 in X direction, and a pair of metal frames 140 and 150 connected to the external electrodes, respectively.

Each of the pair of metal frames 140 and 150 may include a support portion bonded to the external electrodes, and a mounting portion extending in X direction from a lower end of the support portion and spaced apart from the body 110 and the external electrodes.

Here, a width of the mounting portion in Y direction is smaller than a width of the body 110 in Y direction, such that a short circuit defect rate when mounting the electronic component on a board can be lowered.

While exemplary embodiments have been shown and described above, it will be apparent to those skilled in the art that modifications and variations could be made without departing from the scope of the present invention as defined by the appended claims.

What is claimed is:

1. An electronic component comprising:
   a body;
   external electrodes respectively disposed on opposing surfaces of the body in a first direction of the body; and
   a pair of metal frames connected to the external electrodes, respectively,
   wherein each of the pair of metal frames includes a support portion bonded to a respective external electrode, and a mounting portion extending in the first direction from a lower end of the support portion and spaced apart from the body and the external electrodes,
   a width of the mounting portion in a second direction perpendicular to the first direction is smaller than a width of the body in the second direction,
   the support portion includes an upper portion and a lower portion, the lower portion disposed between the upper portion and the mounting portion in a third direction perpendicular to the first and second directions,
   a width of a lowermost portion of the lower portion, that is connected to the mounting portion, in the second direction is smaller than a width of the upper portion in the second direction,
   the lower portion partially overlaps the opposing surfaces of the body in the first direction, and
   the support portion includes only one reduced-width portion.

2. The electronic component of claim 1, wherein $0.2 \leq d/t < 1.0$, in which dimension "t" is the total height of the electronic component in the third direction and dimension "d" is the width of the mounting portion in the second direction.

3. The electronic component of claim 1, wherein a width of the lower portion in the second direction is smaller than the width of the body in the second direction.

4. The electronic component of claim 1, wherein the support portion has cutout portions formed in opposite side surfaces of the lower portion of the support portion.

5. The electronic component of claim 4, wherein the cutout portions are formed in a quadrangular shape.

6. The electronic component of claim 5, wherein the support portion is formed in a T shape.

7. The electronic component of claim 4, wherein the cutout portions are formed in a triangular shape.

8. The electronic component of claim 7, wherein the lower portion of the support portion is formed in a trapezoidal shape.

9. The electronic component of claim 1, wherein the body includes a dielectric layer, and first and second internal electrodes alternately disposed while having the dielectric layer interposed therebetween.

10. The electronic component of claim 9, wherein each of the external electrodes include:
a head portion disposed on the opposing surfaces of the body in the second direction; and
a band portion extending from the head portion to portions of upper and lower surfaces of the body and to portions of opposite side surfaces of the body in the second direction.

11. The electronic component of claim 10, wherein a conductive adhesive portion is disposed between the head portion of the external electrodes and the support portion.

12. The electronic component of claim 1, wherein the width of the mounting portion is smaller than or equal to the width of the lower portion of the support portion.

13. An electronic component comprising:
a capacitor array including a plurality of multilayer capacitors which are sequentially arranged in a first direction,
wherein each of the plurality of multilayer capacitors comprises:
a body;
external electrodes respectively disposed on opposing surfaces of the body in a length direction of the body; and
a pair of metal frames connected to the external electrodes, respectively,
wherein each of the pair of metal frames includes a support portion bonded to a respective external electrode, and a mounting portion extending in the length direction from a lower end of the support portion and spaced apart from the body and the external electrodes,
a width of the mounting portion in a width direction, which is identical to the first direction and perpendicular to the length direction, is smaller than a width of the body in the width direction,
the support portion includes an upper portion and a lower portion, the lower portion disposed between the upper portion and the mounting portion in a vertical direction perpendicular to the length and width directions,
a width of a lowermost portion of the lower portion, that is connected to the mounting portion, in the width direction is smaller than a width of the upper portion in the width direction, and
the lower portion partially overlaps the opposing surfaces of the body in the length direction, and
the support portion includes only one reduced-width portion.

14. The electronic component of claim 13, wherein 0.2≤d/t<1.0, in which dimension "t" is the total height of the electronic component in the vertical direction and dimension "d" is the width of the mounting portion in the width direction.

15. The electronic component of claim 13, wherein a width of the lower portion in the width direction is smaller than the width of the body in the width direction.

16. The electronic component of claim 13, wherein the support portion has cutout portions formed in opposite side surfaces of the lower portion of the support portion.

17. The electronic component of claim 13, wherein the support portion is formed in a T shape.

18. The electronic component of claim 13, wherein the lower portion of the support portion is formed in a trapezoidal shape.

19. The electronic component of claim 13, wherein the width of the mounting portion is smaller than or equal to the width of the lower portion of the support portion.

20. An electronic component comprising:
a body;
external electrodes respectively disposed on opposing surfaces of the body in a first direction of the body; and
a pair of metal frames connected to the external electrodes, respectively,
wherein each of the pair of metal frames includes a support portion bonded to a respective external electrode, and a mounting portion extending in the first direction from a lower end of the support portion and spaced apart from the body and the external electrodes,
a width of the mounting portion in a second direction perpendicular to the first direction is smaller than a width of the body in the second direction,
the support portion includes an upper portion and a lower portion, the lower portion disposed between the upper portion and the mounting portion in a third direction perpendicular to the first and second directions,
a width of a lowermost portion of the lower portion, that is connected to the mounting portion, in the second direction is smaller than a width of the upper portion in the second direction,
the lower portion partially overlaps the opposing surfaces of the body in the first direction, and
the support portion is formed in a T shape.

* * * * *